United States Patent [19]

Mastrup et al.

[11] 4,145,668
[45] Mar. 20, 1979

[54] OPTICAL RESONANCE PUMPED TRANSFER LASER WITH HIGH MULTILINE PHOTON-TO-SINGLE-LINE PHOTON CONVERSION EFFICIENCY

[75] Inventors: Frithjof N. Mastrup, Palos Verdes Peninsula; John H. S. Wang, Rancho Palos Verdes, both of Calif.

[73] Assignee: Hughes Aircraft Company, Culver City, Calif.

[21] Appl. No.: 783,089

[22] Filed: Mar. 31, 1977

[51] Int. Cl.² ............................................. H01S 3/091
[52] U.S. Cl. .......................... 331/94.5 P; 331/94.5 C; 331/94.5 G
[58] Field of Search .................... 331/94.5 G, 94.5 P, 331/94.5 L, 94.5 C

[56] References Cited

U.S. PATENT DOCUMENTS

| 3,597,624 | 8/1971 | Weiner | 331/94.5 P |
| 3,873,941 | 3/1975 | Yarborough et al. | 331/94.5 R |
| 3,969,684 | 7/1976 | deWitte et al. | 331/94.5 C |
| 3,970,963 | 7/1976 | Chester | 331/94.5 C |

OTHER PUBLICATIONS

Wang et al., Applied Physics Letters, vol. 31, No. 1, Jul. 1977, pp. 35-37.

Primary Examiner—William L. Sikes
Assistant Examiner—Marcus S. Rasco
Attorney, Agent, or Firm—Paul M. Coble; W. H. MacAllister

[57] ABSTRACT

Lasers are disclosed wherein trapped multiline laser radiation from a DF laser is employed to pump a DF-$CO_2$ working gas mixture within the optical resonator for the DF laser. The multiline pumping energy is resonantly absorbed by the DF component of the working gas mixture and collisionally transferred to upper energy levels of lasing transitions in $CO_2$. A narrow-band optical resonator disposed about the working gas interaction region with the pumping radiation and tuned to a desired $CO_2$ transition enables a single line laser output to be obtained on the desired transition.

7 Claims, 6 Drawing Figures

Fig. 6.
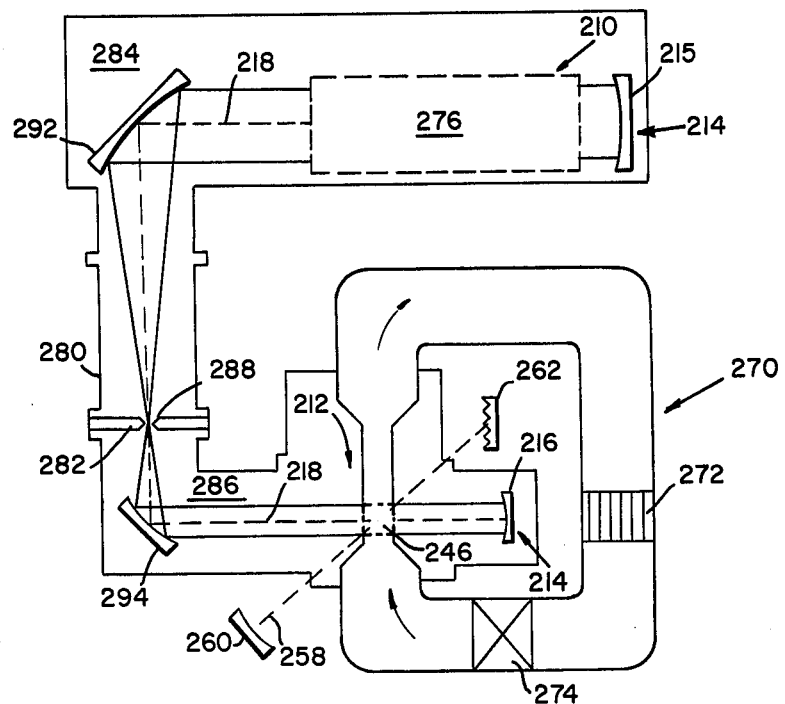
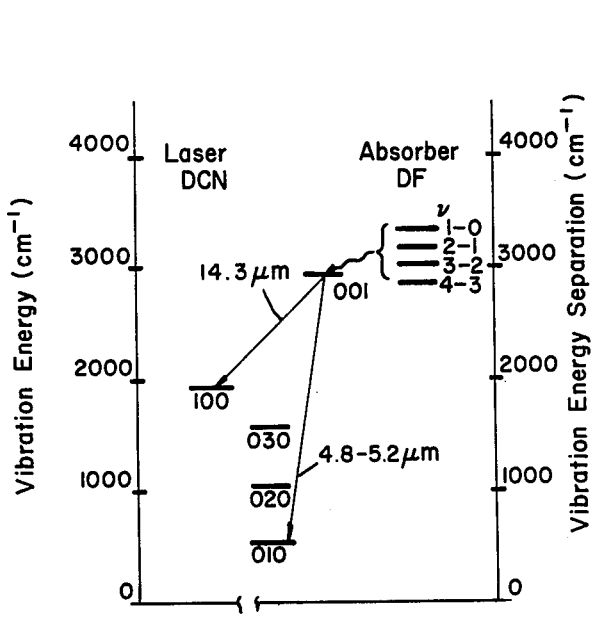
Fig. 4.
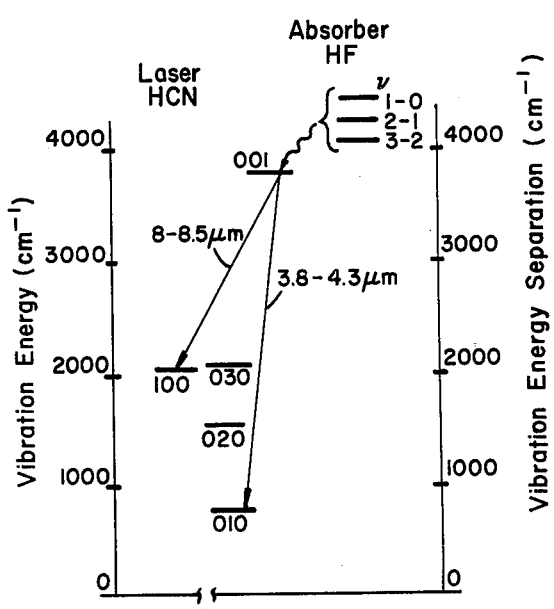
Fig. 5.

OPTICAL RESONANCE PUMPED TRANSFER LASER WITH HIGH MULTILINE PHOTON-TO-SINGLE-LINE PHOTON CONVERSION EFFICIENCY

BACKGROUND OF THE INVENTION INCLUDING PRIOR ART STATEMENT

This invention relates to lasers, and more particularly, it relates to laser-pumped lasers utilizing a working gas mixture which resonantly absorbs the pumping radiation.

In certain laser applications, such as optical communication, radar or surveillance systems involving airborne or space vehicles, the availability of electrical power is greatly restricted due to size and weight limitations. Thus, interest has turned to lasers which do not require electrical excitation, for example, chemical lasers.

Many of the foregoing and other laser applications require single-line laser radiation, i.e., laser energy centered at a particular frequency rather than at several neighboring frequencies. Single-line laser radiation can be provided by employing a narrow-band resonator (including a diffraction gating, for example) tuned to the desired laser line in the laser which generates the radiation in question. While the use of such resonators is not detrimental for laser media such as carbon dioxide ($CO_2$) which utilize laser transitions in triatomic and higher order polyatomic molecules, a substantial reduction in laser efficiency occurs when single-line operation is enforced directly in laser media involving transitions in diatomic molecules, and which molecules are used in chemical laser media such as hydrogen fluoride (HF) and deuterium fluoride (DF). This reduction in efficiency results from the prevention of the cascading of an operating laser transition to another transition between the next successive pair of vibrational energy levels when the starting and terminal energy levels of the operating transition become depopulated and populated, respectively, thereby wasting vibrational excitation energy which otherwise would be available for providing the useful laser output.

A class of lasers which are pumped chemically and which lase on molecular transitions in triatomic media are ordinary transfer chemical lasers. In this type of laser, chemical reactions are employed to produce excited energy levels in a gaseous material such as HF or DF, and energy from these excited levels is transferred to the upper energy level of a lasing transition in another material such as $CO_2$. Transfer chemical lasers are described in more detail by Terrill A. Cool in Chapter 7 of *Handbook of Chemical Lasers*, John Wiley & Sons, New York, 1976, pages 431–467.

In ordinary transfer chemical lasers the operating efficiency decreases as the pressure of the gaseous medium within the laser cavity increases. Since increased operating pressures give rise to increased laser bandwidth, a limit is imposed on the bandwidths achievable with transfer chemical lasers. In addition, since this type of laser operates with an open cycle, i.e., the laser gas is exhausted from the device after being used, it becomes very expensive to employ transfer chemical lasers for generating laser lines requiring certain scarce laser materials.

Another type of laser which recently has been devised is the optical resonance pumped transfer laser. This type of laser utilizes optical pumping of a resonant absorber followed by collisional vibrational-to-vibrational (V-V) energy transfer to the laser gas. In one form of optical resonance pumped transfer laser, a hydrogen halide chemical laser is employed as the optical pump, and the same hydrogen halide gas is mixed with the laser gas to act the resonant absorber for the pumping energy. The foregoing optical resonance pumped transfer laser is described in more detail in a paper by R. M. Osgood, Jr., "Optically Pumped 16 μm $CO_2$ Laser", *Applied Physics Letters*, Vol. 28, No. 6, (Mar. 15, 1976), pages 342–345.

In the specific laser disclosed in the aforementioned Osgood, Jr. paper, a pulsed HBr laser and a pulsed $CO_2$ pin laser are used in combination to pump a mixture of HBr and $CO_2$ gas so as to obtain a $CO_2$ laser output at wavelengths of 14 μm and 16 μm. This paper in no way suggests how the optical resonance pumped transfer laser concept could be advantageously exploited to achieve high efficiency photon conversion of multiline laser radiation into single-line laser radiation. Moreover, since high repitition rate pulsed chemical lasers are not presently available, the average power output achievable with optical resonance pumped transfer lasers of the prior art is severely limited.

SUMMARY OF THE INVENTION

It is an object of the present invention to provide an optical resonance pumped transfer laser affording high multiline photon-to-single-line photon conversion efficiency.

It is a further object of the invention to provide an optical resonance pumped transfer laser which is capable of operating over substantially wider optical bandwidths than otherwise comparable transfer chemical lasers.

It is a still further object of the invention to provide an optical resonance pumped transfer laser exhibiting wavelength versatility through the ready substitution of a variety of laser media.

It is another object of the invention to provide an optical resonance pumped transfer laser which is capable of closed cycle operation, thereby greatly reducing the expense associated with the use of scarce laser media when it is desired to generate less common laser lines.

It is yet another object of the invention to provide an optical resonance pumped transfer laser capable of affording a higher average power output than any previous laser of this type.

It is a still further object of the invention to provide an efficient and reliable high power laser of compact and lightweight design, and which is capable of wide bandwidth operation with high frequency stability.

A laser according to the invention includes a first volume of a first gas including diatomic molecules having first laser transitions between different vibrational energy levels. A first optical resonator disposed about the first volume of the first gas is tuned to selected ones of the first laser transitions. A second volume of gas is disposed within the first optical resonator in optical communication with and separated from the first volume of the first gas. The second volume of gas includes a mixture of the same gas as the first gas and a second gas including polyatomic molecules containing at least three atoms. The polyatomic molecules have second laser transitions from upper energy levels near the upper energy levels of the selected ones of the first laser transitions. A second optical resonator disposed about the second volume of gas is tuned to a selected one of the second laser transitions.

When the diatomic molecules in the first volume of the first gas are excited to a condition of population inversion between the upper and lower energy levels of the selected first laser transitions, multiline, laser oscillation is produced in the first optical resonator. The energy from this laser oscillation is absorbed by the diatomic molecules in the first gas in the second volume of gas and is collisionally transferred to the polyatomic molecules in the second volume of gas to produce population inversion between the upper and lower energy levels of the second laser transitions, enabling single-line laser oscillation to occur in the second optical resonator on the selected second laser transition. The entrapment of multiline first laser radiation within the first optical resonator generates exceedingly high multiline optical radiation flux in the second volume of gas, thereby establishing a radiation-controlled distribution among excited vibrational energy levels of the first gas in the second volume. This trapped radiation field-induced excited energy level distribution for the first gas in the second volume provides the conditions for effective absorption of multiline first laser radiation. Since the multiline laser radiation traverses the second volume of gas on each pass through the first optical resonator, almost all of this radiation is utilized as a pump flux for the first gas in the second volume, thereby enabling very high efficiency conversion of multiline photons to single-line photons to be achieved.

Additional objects, advantages and characteristic features of the invention will become apparent from the following detailed description of preferred embodiments of the invention when considered in conjunction with the accompanying drawing.

BRIEF DESCRIPTION OF THE DRAWING

In the accompanying drawing:

FIGS. 2, 3, 4 and 5 are respective energy level diagrams for alternate exemplary working gas mixtures which may be employed in a laser according to the invention; and FIG. 6 is a schematic illustration of a closed cycle optical resonance pumped transfer laser which may be constructed in accordance with the invention.

DESCRIPTION OF THE PREFERRED EMBODIMENTS

Figure 1:
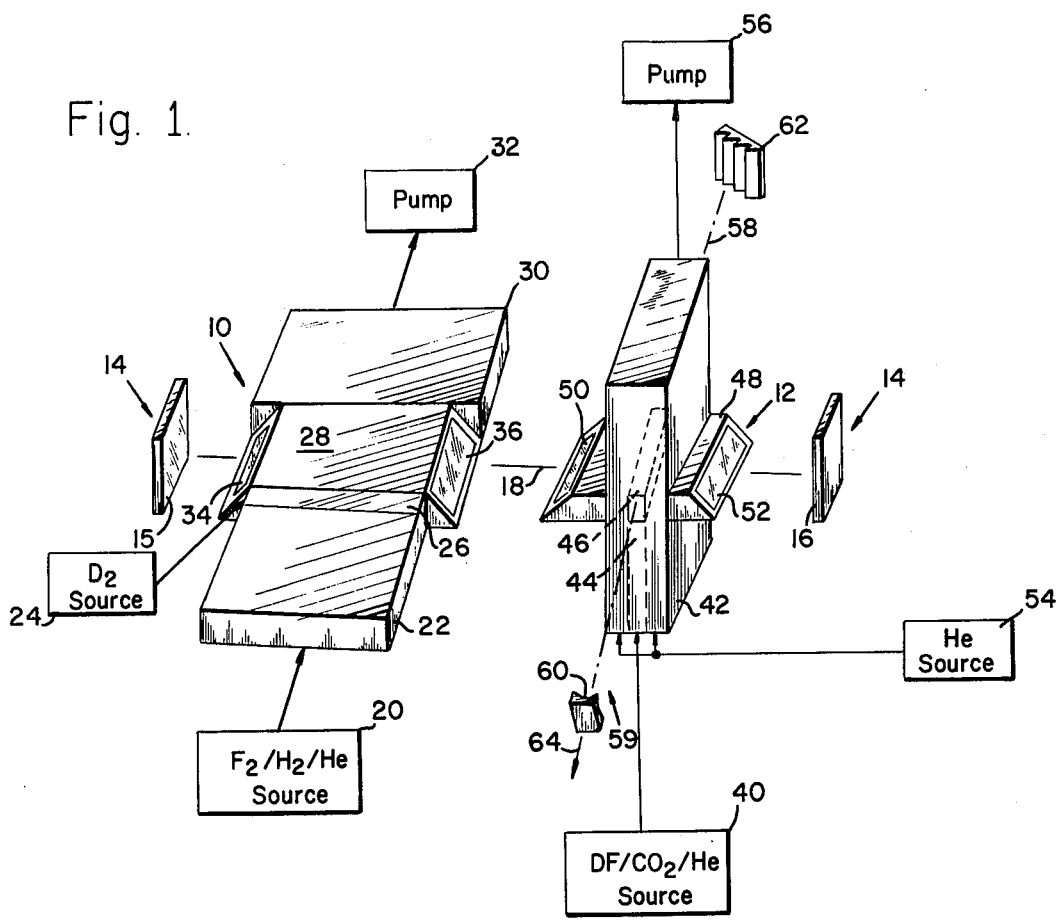
FIG. 1 is a perspective view, partly in schematic form, illustrating an optical resonance pumped transfer laser in accordance with the invention.

Referring to FIG. 1 with greater particularity, an optical resonance pumped transfer laser according to the invention may be seen to include a pumping laser 10 and an output-providing laser 12 mounted within a common optical resonator 14. The resonator 14 consists of a pair of mirrors 15 and 16 arranged to regeneratively reflect laser radiation generated by the laser 10 along an axis 18 through the lasers 10 and 12. The pumping laser 10 preferably utilizes a laser medium comprising diatomic molecules. A specific exemplary pumping laser 10 which may be employed is a CW (continuous wave) deuterium fluoride (DF) chemical laser, although it should be understood that lasers employing other media are also suitable.

In the exemplary pumping laser 10 shown in FIG. 1 a mixture of fluorine ($F_2$), hydrogen ($H_2$) and helium (He) gas from a source 20 is fed to a combustor 22 in which some of the $F_2$ gas is decomposed into F atoms. The F atoms and deuterium ($D_2$) molecules from a source 24 are accelerated by means of an injection nozzle 26 into a laser cavity 28 which is disposed between the mirrors 15 and 16 along the axis 18. Chemical reactions between the F atoms and $D_2$ molecules produce DF molecules in excited energy levels, resulting in the emission of laser radiation in the wavelength range of approximately 3.6–3.9 $\mu$m. The reaction products are removed from laser cavity 28 via suitable ducting 30 connected between the laser cavity 28 and an exhaust pump 32. The opposite ends of the laser cavity 28 along the axis 18 are provided with Brewster angle windows 34 and 36, respectively, in order to isolate the interior of the cavity 28 from the ambient atmosphere. Further details concerning a specific exemplary DF laser which may be employed for the pumping laser 10 may be found in the paper "3–5 Micron Chemical Laser", by F. N. Mastrup et al, TRW Technical Report AFAL-TR-7382, May 1973.

The output-providing laser 12 utilizes a working gas mixture including a laser gas and an absorber gas, the absorber gas being the same gas as that employed as the lasing medium of the pumping laser 10. Thus, when the pumping laser 10 is a DF chemical laser, the absorber gas in the working gas mixture for the output laser 12 would be DF. Also, the laser gas component of the working gas mixture should comprise polyatomic molecules containing at least three atoms so that lasing can be constrained to a single line without impairing the laser efficiency. In a preferred embodiment of the invention, the laser gas employed in the output laser 12 is carbon dioxide ($CO_2$). However, other laser gases as well as combinations of laser and absorber gases are also suitable, as will be discussed more fully below.

The working gas mixture for the output laser 12 is fed from a source 40 to the central region of a flow channel housing 42 disposed to enable flow of the working gas mixture through the output laser 12 along a direction perpendicular to the axis 18. Within the flow channel housing 42, the working gas mixture passes through a nozzle 44 and into an interaction region 46 where the working gas mixture is irradiated with laser radiation from the pumping laser 10. The interaction region 46 is surrounded by a chamber 48 which extends outwardly from the flow channel housing 42 along the axis 18. The opposite ends of the chamber 48 along the axis 18 are provided with Brewster angle windows 50 and 52, respectively, to isolate the interior of the chamber 48 from the ambient atmosphere. Moreover, in order to eliminate undesirable boundary layer interactions, a blanket of an inert gas such as He from a source 54 is caused to flow through the outer regions of the gas flow channel housing 42 in a manner surrounding the flow of the working gas mixture through the housing 42. The working and inert gases are removed from the downstream end of the flow channel housing 42 by means of an exhaust pump 56.

A narrow-band optical resonator 59, which is tuned to the desired output wavelength from the laser 12, is provided along an axis 58 through the interaction region 46 along a direction perpendicular to both the axis 18 and the direction of gas flow through the housing 42. As shown in FIG. 1, the resonator 59 may comprise a mirror 60 and a diffraction grating 62 disposed along the axis 58 and spaced from opposite ends of the interaction region 46. Brewster angle windows (not shown) may be provided in opposite sides of the housing 42 along the axis 58 in order to minimize optical loss in the resonator 59. As a specific example for illustrative purposes, when the working medium for the laser 12 includes $CO_2$ as the lasing gas, the resonator for the laser 12 may be tuned to the P(20) transition of the (001)-(100) band at a wavelength of approximately 10.6 μm, although it should be understood that other transitions also may be employed. An output laser beam 64 from the laser 12 may be obtained along the axis 58 by making the mirror 60 partially transmissive, or alternatively, the output laser beam may be taken from the diffraction grating 62.

In a specific examplary laser which may be constructed according to the embodiment of the invention illustrated in FIG. 1, the pumping laser 10 may be a CW DF chemical laser providing a 70-watt output beam having a 3 cm × 1 cm cross-section in a plane perpendicular to axis 18. The optical resonator 14 may be tuned to the wavelength range extending from about 3.6 μm to about 3.9 μm. The working gas for the output laser 12 may comprise a mixture of DF, $CO_2$, and He (which acts both as a diluent and as a deactivator of the lowest bending mode of $CO_2$) in a ratio of 1/19/80 by mole fraction. The working gas mixture may flow through the interaction region 46 (which has dimensions of 3 cm × 1 cm × 0.3 cm) at a flow velocity of $10^4$ cm per second and a pressure of 22 Torr, with the lasing axis 58 for the laser 12 located 1.5 mm downstream from the center of the interaction region 46. The narrow-band optical resonator 59 for the laser 12 (which may be tuned to a wavelength of approximately 10.6 μm) may consist of a 97% reflective spherical mirror 60 having a 1 m radius of curvature and spaced from diffraction grating 62 by a distance of 90 cm along the axis 58.

Figure 2:
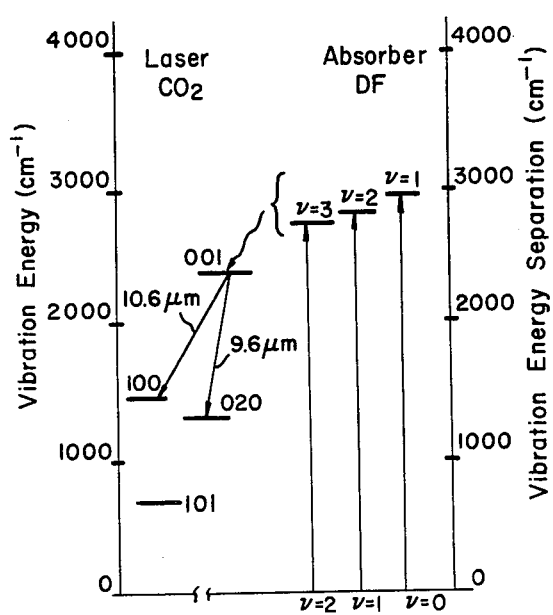

The operation of a laser according to the invention will now be discussed with reference to FIG. 2 which is an energy level diagram for the particular working gas mixture of DF and $CO_2$ set forth in the aforedescribed specific examplary embodiment. DF laser radiation is emitted from the pumping laser 10 on a number of transitions between different vibrational energy levels including the ($v = 1 \rightarrow v = 0$), ($2 \rightarrow 1$) and ($3 \rightarrow 2$) transition bands (with lower state rotational quantum numbers ranging from $J'' = 5$ to $J'' = 10$). This DF laser radiation regneratively traverses the interaction region 46 where it interacts with the flowing working gas mixture from the source 40. The DF laser power incident on the working gas mixture is resonantly absorbed by DF molecules in the working gas mixture, thereby exciting the DF molecules. Initially, all DF molecules are in the vibrational ground state; therefore, only the DF ($1 \rightarrow 0$) component of the incident radiation initially participates in optically pumping DF molecules in the working gas from the ground state to the first vibrational level ($v$ 1). However, once some DF molecules have been excited to the first vibrational level, optical resonance absorption from the incident (2 $\rightarrow$ 1) radiation component further excites DF molecules in the working gas mixture from the first vibrational level ($v$ 32 1) to the second vibrational level ($v = 2$). Similarly, optical resonance absorption from the incident (3 $\rightarrow$ 2) radiation further excites DF molecules from the second ($v = 2$) to the third ($v = 3$) vibrational level. Eventually, at a sufficient high primary laser flux a quasi-stationary state of equilibrium is reached in which all DF pump bands actively participate in the resonance absorption excitation process.

The energy from the excited DF molecules in the working gas mixture is then collisionally transferred to the (001) energy levels of $CO_2$ molecules in the working gas mixture which lie near the excited DF energy levels. Population inversion is thereby created between the (001) $CO_2$ energy levels and lower $CO_2$ energy levels such as the (100) and the (020) levels, permitting lasing to occur on transitions between the (001) and the lower $CO_2$ energy levels. By tuning the narrow-band optical resonator 59 for the laser 12 to a desired laser line among the aforementioned $CO_2$ laser transitions, the laser 12 can be constrained to lase on a single desired line such as the P(20) line of the (001)-(100) band at a wavelength of approximately 10.6 μm.

Since the interaction region 46 is located within the optical resonator 14 for the pumping laser 10, multiline photons from the laser 10 trasverse the region 46 on each pass between the mirrors 15 and 16. For negligible mirror and other medium losses, all of the pump power from the laser 10 is transferred to the lasing gas ($CO_2$) of the working gas mixture after a sufficient number of DF photon passes. As a result, a very high multline photo-to-single-line-photon conversion efficiency (i.e., the ratio of the number of output photons from the laser 12 to the number of output photons from the laser 10) which in principle approaches 100% may be obtained.

Figure 3:
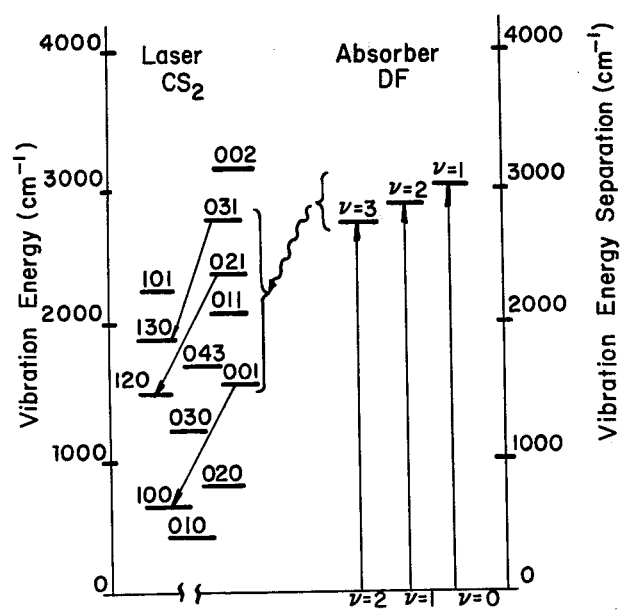

As was mentioned above, a working gas mixture including deuterium fluoride (DF) and carbon dioxide ($CO_2$) as the absorber and laser gases, respectively, is only one of a number of different combinations of absorber and laser gases which may be employed in a laser according to the invention. The relevant energy level structure and operating transitions for three alternate examplary working gas combinations which may be employed in a laser according to the invention are depicted in FIGS. 3, 4 and 5. In the combination of FIG. 3 the absorber gas is deuterium fluoride (DF), while the laser gas is carbon disulfide ($CS_2$); FIG. 4 shows deuturium fluoride (DF) as the absorber gas and deuterium cyanide (DCN) as the laser gas; and FIG. 5 depicts hydrogen fluoride (HF) as the absorber gas and hydrogen cyanide (HCN) as the laser gas.

An optical resonance pumped transfer laser according to the invention may be operated with a closed cycle, i.e., the working gas is reused many times by recirculating it through the interaction region. An embodiment of the invention providing a closed cycle optical resonance pumped transfer laser is shown in FIG. 6. Components in the embodiment of FIG. 6 which correspond to respective components in the embodiment of FIG. 1 are designated by the same second and third reference numeral digits as their corresponding components in FIG. 1, along with the addition of a prefix numeral "2".

In the embodiment of FIG. 6, the working gas for the output laser 212 is recirculated through the interaction region 246 by conventional recirculation apparatus 270 including a heat exchanger 272 and a compressor 274. In addition, in the laser of FIG. 6, both the interaction region 246 and lasing region 276 of the pumping laser 210 are contained within a common housing 280. A partitioning member 282 divides the housing 280 into a pair of chambers 284 and 286 containing the respective regions 276 and 246 so that these regions may be maintained at different operating pressures. As a specific illustrative example, for a laser employing the aforementioned DF-$CO_2$ gas combination, the chamber 284 containing pumping DF gas may be operated at a pressure ranging from about 3 Torr to about 20 Torr, while the chamber 286 through which the working DF-CO$_2$ gas mixture flows may be operated at a pressure of about 190 Torr. Partitioning member 282 is provided with an aperture 288 of sufficiently small dimensions to function as an aerodynamic window while permitting laser radiation from the pumping laser 210 to travel between the chambers 284 and 286.

In the arrangement shown in FIG. 6, mirrors 215 and 216 are spherical reflectors having an approximately common focal point lying substantially within the cavity isolation aperture 288. Also, in the laser of FIG. 6, the pumping radiation regenerative path 218 through the chambers 284 and 286 between resonator mirrors 215 and 216 may be effectively folded by means of intermediate beam deflecting mirrors 292 and 294 disposed in the respective chambers 284 and 286, thereby providing a more compact overall laser configuration. In addition to affording closed cycle operation, the embodiment of FIG. 6 eliminates the need for Brewster angle windows along the pumping radiation path, thereby reducing optical loss and enabling increased multiline photon-to-single-line photon conversion efficiency to be achieved.

Although the present invention has been shown and described with reference to particular embodiments, nevertheless various changes and modifications obvious to a person skilled in the art to which the invention pertains are deemed to lie within the spirit, scope and contemplation of the invention.

What is claimed is:

1. A laser comprising:
   a first volume of a first gas including diatomic molecules having first laser transitions between different vibrational energy levels;
   a first optical resonator disposed about said first volume of said first gas along a first axis through said first volume of said first gas and tuned to selected ones of said first laser transitions;
   a second volume of gas disposed within said first optical resonator in optical communication with and separated from said first volume of said first gas, said second volume of gas including a mixture of said first gas and a second gas including polyatomic molecules containing at least three atoms, said polyatomic molecules having second laser transitions from upper energy levels near the upper energy levels of said selected ones of said first laser transitions;
   a second optical resonator disposed about said second volume of gas along a second axis through said second volume of gas and tuned to a selected one of said second laser transitions, said second axis being oriented in a predetermined angular relationship relative to said first axis, said second optical resonator including means for abstracting laser energy therefrom; and
   means for exciting said diatomic molecules of said first volume of said first gas to a condition of population inversion between the upper and lower energy levels of said selected ones of said first laser transitions to produce multiline laser oscillation in said first optical resonator, the energy from which is absorbed by said diatomic molecules of said first gas in said second volume of gas and collisionally transferred to said polyatomic molecules to produce population inversion between the upper and lower energy levels of said second laser transitions, whereby single-line laser oscillation is obtained in said second optical resonator on said selected one of said second laser transitions.

2. A laser according to claim 1 wherein said first gas is deuterium fluoride and said second gas is carbon dioxide.

3. A laser according to claim 1 wherein said first gas is deuterium fluoride and said second gas is carbon disulfide.

4. A laser according to claim 1 wherein said first gas is deuterium fluoride and said second gas is deuterium cyanide.

5. A laser according to claim 1 wherein said first gas is hydrogen fluoride and said second gas is hydrogen cyanide.

6. A laser according to claim 1 wherein said first axis is disposed perpendicular to said second axis.

7. A laser according to claim 1 wherein said first optical resonator comprises:
   first and second curved reflectors optically facing one another and having an approximately common focal point therebetween, partitioning means disposed substantially along a plane passing through said focal point and defining an aperture encompassing said focal point for dividing the space between said reflectors into first and second regions, said first volume of said first gas being disposed within said first region and said second volume of gas being disposed within said second region.

* * * * *